(12) United States Patent
Silva

(10) Patent No.: US 10,667,889 B2
(45) Date of Patent: Jun. 2, 2020

(54) DEVICE TO BE FITTED IN THE MOUTH IN ORDER TO ISOLATE A DENTAL AREA, FACILITATING CORRECT DENTAL TREATMENT

(71) Applicant: Ignacio Rippes Silva, Santiago (CL)

(72) Inventor: Ignacio Rippes Silva, Santiago (CL)

(73) Assignee: DentalTOR, Inc., Boston, MA (US)

( * ) Notice: Subject to any disclaimer, the term of this patent is extended or adjusted under 35 U.S.C. 154(b) by 0 days.

(21) Appl. No.: 15/567,893

(22) PCT Filed: Apr. 11, 2016

(86) PCT No.: PCT/CL2016/000018
§ 371 (c)(1),
(2) Date: Apr. 25, 2018

(87) PCT Pub. No.: WO2016/168947
PCT Pub. Date: Oct. 27, 2016

(65) Prior Publication Data
US 2018/0221125 A1    Aug. 9, 2018

(30) Foreign Application Priority Data
Apr. 20, 2015   (CL) .................... 1000-2015

(51) Int. Cl.
*A61C 17/08* (2006.01)
*A61C 5/90* (2017.01)

(52) U.S. Cl.
CPC ................ *A61C 17/08* (2019.05); *A61C 5/90* (2017.02)

(58) Field of Classification Search
CPC ....... A61C 17/04; A61C 17/06; A61C 17/043; A61C 17/046; A61C 17/14; A61C 17/0211; A61C 17/0208; A61C 19/001; A61C 5/82; A61C 5/90
USPC .......................................... 433/93, 138, 140
See application file for complete search history.

(56) References Cited

U.S. PATENT DOCUMENTS

| 730,184 | A | * | 6/1903 | Witter | A61B 13/00 600/240 |
| 1,053,965 | A | * | 2/1913 | Barghausen | A61C 17/08 433/93 |
| 1,742,080 | A | | 12/1929 | Howard | |
| 2,873,528 | A | | 2/1957 | Thompson | |

(Continued)

FOREIGN PATENT DOCUMENTS

EP    0879581    11/1998

OTHER PUBLICATIONS

International Search Report and English Translation Written Opinion from PCT/CL2016/000018, dated Jul. 6, 2016.

*Primary Examiner* — Cris L. Rodriguez
*Assistant Examiner* — Matthew P Saunders
(74) *Attorney, Agent, or Firm* — Morse, Barnes-Brown & Pendleton, P.C.; Stanley F. Chalvire, Esq.

(57) ABSTRACT

The invention relates to a device which is inserted into the mouth so as to isolate the dental part or area of the mouth to be treated, allowing improved vision, preventing the cheek and the tongue from impinging on the working area, and protecting the tissues of the patient from the dental instruments. Furthermore, the sucking capacity of the device prevents the saliva or any other fluid generated during the treatment from affecting both vision and the performance of a correct technique for carrying out the dental treatment.

7 Claims, 2 Drawing Sheets

(56) References Cited

U.S. PATENT DOCUMENTS

| | | | | |
|---|---|---|---|---|
| 2,823,455 A * | 2/1958 | Sprague | A61B 1/24 | 433/93 |
| 3,091,859 A | 6/1963 | Baughan | | |
| 3,101,543 A | 8/1963 | Baughan | | |
| 3,256,885 A * | 6/1966 | Higgins | A61C 17/08 | 604/268 |
| 3,426,430 A | 2/1969 | Newman | | |
| 4,802,851 A * | 2/1989 | Rhoades | A61C 17/08 | 433/93 |
| 5,071,347 A * | 12/1991 | McGuire | A61C 17/08 | 433/91 |
| 5,094,256 A * | 3/1992 | Barth | A61C 15/00 | 132/322 |
| 5,203,699 A * | 4/1993 | McGuire | A61C 17/08 | 433/93 |
| 5,800,367 A * | 9/1998 | Saxer | A61C 17/0211 | 433/80 |
| 5,827,061 A * | 10/1998 | Goodman | A61C 17/08 | 433/93 |
| 5,842,244 A * | 12/1998 | Hilfinger | A61C 17/22 | 15/22.1 |
| 5,890,899 A * | 4/1999 | Sclafani | A61C 17/08 | 433/140 |
| 6,309,218 B1 * | 10/2001 | Ellenbecker | A61C 17/08 | 433/93 |
| 6,736,640 B1 * | 5/2004 | Ellenbecker | A61C 17/08 | 433/93 |
| 6,837,707 B2 * | 1/2005 | Figueredo Torres | A61B 1/247 | 433/31 |
| 7,972,136 B2 * | 7/2011 | Hegemann | A61C 17/0202 | 15/167.1 |
| D696,021 S * | 12/2013 | Hegemann | D4/101 | |
| 9,707,062 B2 * | 7/2017 | Bombin | A61C 17/08 | |
| D819,276 S * | 5/2018 | Kramer | D28/68 | |
| 2006/0008764 A1 | 1/2006 | Abo | | |
| 2015/0064646 A1 * | 3/2015 | Bombin | A61C 17/08 | 433/91 |

\* cited by examiner

DEVICE TO BE FITTED IN THE MOUTH IN ORDER TO ISOLATE A DENTAL AREA, FACILITATING CORRECT DENTAL TREATMENT

This application is a national stage filing under 35 U.S.C. 371 of International Application No. PCT/CL2016/000018, filed Apr. 11, 2016, which claims priority to CL 1000-2015, filed Apr. 20, 2015. The entire teachings of PCT/CL2016/000018 are incorporated herein by reference.

The present invention consists of a device that is inserted into the mouth to isolate the dental part or area of the mouth to be treated, allowing improved vision, preventing the cheek and the tongue from impinging the working area, and the saliva from affecting both the vision and the realization of a correct technique to perform the dental treatment.

STATE OF THE ART

At present, most dental devices only solve one of the many problems presented during dental treatment.

The most widely used systems in the world today consist in two devices: a flexible ejector with a metal core that makes it maintain the shape one wants to give it and cotton rolls to separate tissues from the patient and absorb the saliva or liquids present. This system is not ideal since the patient can easily move both the rolls and the ejector, it cannot allows completely isolating the work area, it is necessary to have the help of an assistant to position the ejector in the correct position in some cases, the ejector is easily blocked with detritus, and may cause gagging or discomfort to the patient.

To resolve these issues, multiple ejector variations and new but more complex devices have been devised. Variations in the shape of a single tube, as exemplified in the patents: U.S. Pat. No. 4,586,900 A, US 20140087328 A1, U.S. Pat. No. D 312,872 S are variations of either the shape of the tube or its nozzle, but they fail to completely isolate the tooth.

There are also other devices comprising a tube forming a circuit in the mouth around the area to be treated or in relation to the entire mouth such as in the patents: U.S. Pat. Nos. 4,417,874 A, 2,873,528 A, 7,261,560 B2, 4,776,793 A; although they manage to wrap the tooth, they do not separate the tissues correctly and are complex and costly devices.

There are also devices that add new parts to the classic ejector, such as armatures that separate the tissues, such as in U.S. Pat. No. 8,360,773 B2.

Tubes joining complex rubber dam isolation devices such as in U.S. Pat. No. 4,310,308 A. Systems comprising many large volume and costly parts systems that more aggressively separate oral tissues such as in US 2014/0212839 A1.

And devices comprising tubes that adhere to rotary equipment such as in U.S. Pat. No. 523,262 A.

All the aforementioned devices are not able to solve the problems presented by the current dental treatment: they are not able to expose correctly the operative field, either because they block the vision or because they do not separate the tissues correctly; they are easily removed by the patient or cause gagging; they do not completely remove saliva or fluids from the area to be treated, hindering or preventing the correct performance of the treatment; they allow the passage of debris of large volume to the vacuum equipment generating clogging; they require the presence of an assistant to keep the equipment in its correct position; and they require the use of other devices such as rolls, rubber dam, and others to achieve correct insulation.

DETAILED DESCRIPTION OF THE INVENTION

Figure 1:
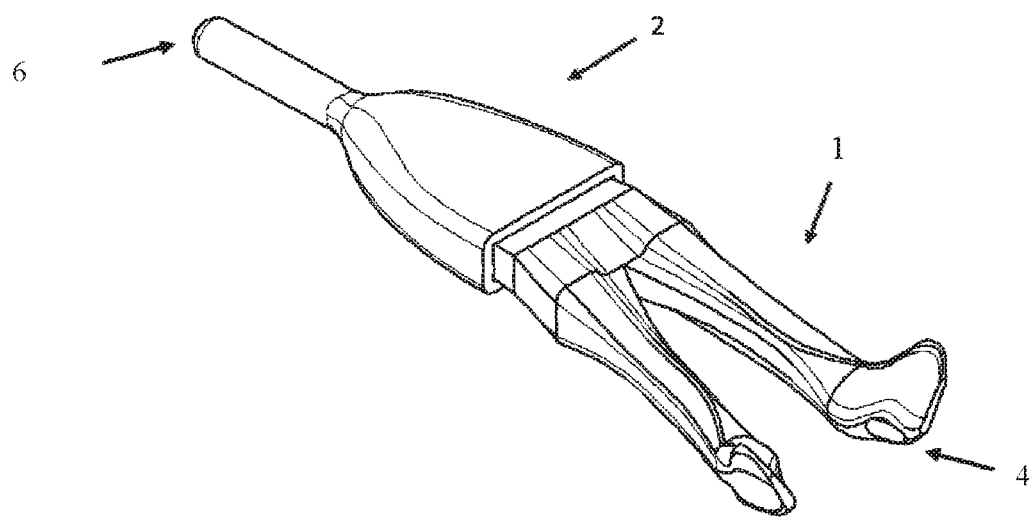
FIG. 1. Top isometric view, assembled sections
FIG. 2. Side view, assembled sections
FIG. 3. Top view, assembled sections
FIG. 4. Top isometric view, body section
FIG. 5. Top isometric view, section connector handle
FIG. 6. Top isometric view, section connector handle from the outlet opening (6).
Figure 2:
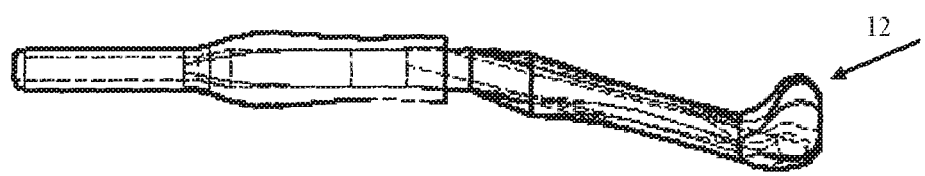
Figure 3:
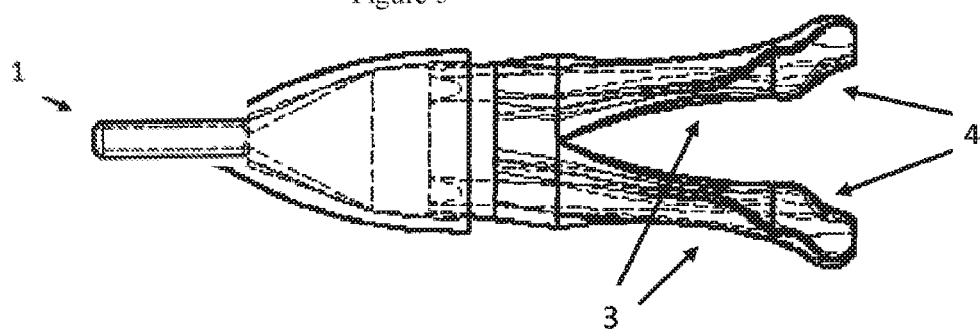
Figure 4:
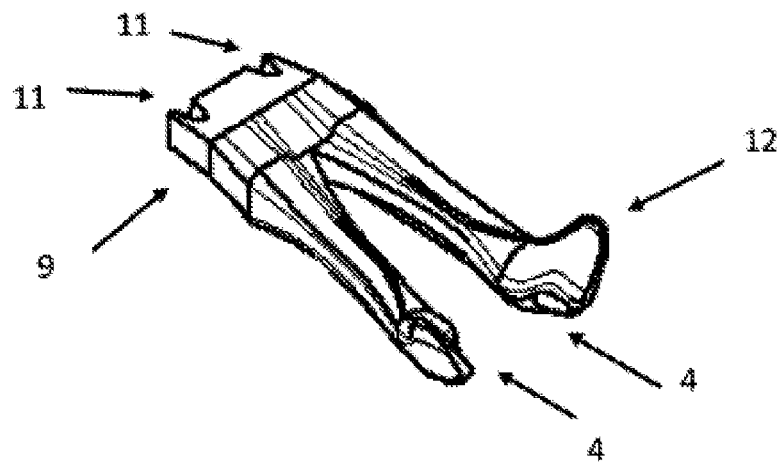
Figure 5:
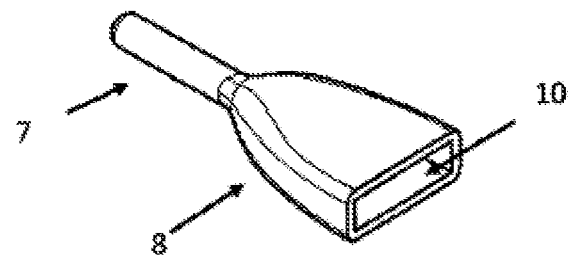
Figure 6:
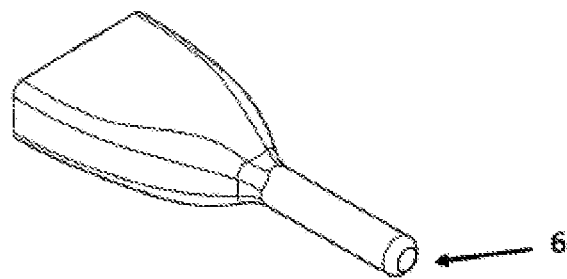

The device has a hollow body comprising two sections: a body (1) and a connector handle (2), which are assembled into a single structure having an internal cavity that runs throughout the length of the device from the outlet opening (6) in the connector up to the inlet openings (4) in the arms (3) of the body (1).

The connector handle section (2) is divided into two parts:

The connector (7) with a circular axial profile is located at the end opposite the end where the arms of the body section are, measures between 10% and 40% of the total length of the device and has an axially round outer shape and a circular lumen.

The handle (8) forms part of the connector handle which allows connecting with the body section of the device (1) through a square shaped concavity (10) forming an inner lumen ending in the outlet opening (6).

The body section (1) is divided into two parts:

A square profile union (9) which allows connecting with the handle part (8) of the connector handle comprises outlet openings (11) which communicate the inlet openings (4) through the inner lumen.

Arms (3) which emerge together from the joining portion of the body section are spaced apart until they reach a distance between their inner faces of between 1 cm and 3.5 cm at their section farthest from the joining portion. The arms (3) have between 1 to 10 inlet openings (4) per arm which communicate with the internal lumen of the body. The arms are shaped like a drop in their axial profile with their thickest portion in the lower part. The arms have an upward extension (12) at their farthest ends.

EXAMPLE OF APPLICATION

The device is assembled by attaching the connector handle section to the body section. The device is connected to the vacuum system of the dental chair through the connector of the device.

It is inserted into the patient's mouth by placing the area to be treated between the two arms of the body.

The arms of the device expose the area to be treated by pushing aside the patient's tongue and cheeks and preventing them from entering the treatment area.

The lower edge of the arms, which is thicker, will allow a comfortable placement against the patient's gum, preventing injury to the gum when in contact with it.

The length separating the two arms in the lower part allows a close contact with the gum while giving a point of support and the length formed by the lateral faces pushes the tissues aside and allows the easy performance of any treatment.

The openings of the arms surround the portion or area to be treated while absorbing any liquid or debris from the zone which makes the work easy.

When performing tartar removal treatments, both supra and infra gingival, the removed tartar or debris will be trapped between the inner faces of the arms, facilitating their removal from the patient's mouth.

Any debris generated during dental treatment will be absorbed by the dental device.

The invention claimed is:

1. A device which is configured to be installed in the mouth in order to isolate a dental area to facilitate a correct dental treatment, wherein the device comprises a hollow body from which a handle and two arms are emerging, wherein the hollow body comprises an internal cavity through the length of the device, wherein each arm has an inlet opening, wherein the handle has an outlet opening in fluid communication with each inlet opening through the internal cavity of the hollow body, wherein the arms have an upward extension at an end of each arm, wherein each arm comprises an inner face, and wherein the inner faces of the arms form between the faces an angle between 60° and 90° at least opening from a gingival to an occlusal direction.

2. The device according to claim 1, wherein the hollow body is formed by two sections assembled together.

3. The device according to claim 1, wherein the arms isolate the dental area by pushing a subject's tongue and cheek aside, thereby preventing the subject's tongue and cheek from entering the dental area.

4. The device according to claim 1, wherein the arms are in a proportion to the total length of the device of between 20% and 45%.

5. The device according to claim 1, wherein each arm comprises an axial section, wherein the axial section of the arms is shaped like a drop, wherein each arm comprises a lower part, and wherein the greatest thickness is in the lower part of the arm.

6. The device according to claim 1, wherein the device comprises one or more edges, and wherein all of the edges end in semicircles of at least 0.5 mm in diameter.

7. The device according to claim 2, wherein the sections are joined by pressure or male and female connectors.

* * * * *